United States Patent [19]
Koike et al.

[11] Patent Number: 5,593,621
[45] Date of Patent: Jan. 14, 1997

[54] METHOD OF MANUFACTURING PLASTIC OPTICAL TRANSMISSION MEDIUM

[76] Inventors: Yasuhiro Koike, 534-23, Ichigao-cho, Midori-ku, Yokohama-shi, Kanagawa, 225; Ryo Nihei, Room 302, Abanraifunomura, 1-8-20, Nakanoshima, Tama-ku, Kawasaki-shi, Kanagawa, 214, both of Japan

[21] Appl. No.: 211,666
[22] PCT Filed: Aug. 16, 1993
[86] PCT No.: PCT/JP93/01148
§ 371 Date: Apr. 14, 1994
§ 102(e) Date: Apr. 14, 1994
[87] PCT Pub. No.: WO94/04949
PCT Pub. Date: Mar. 3, 1994

[30] Foreign Application Priority Data

Aug. 17, 1992 [JP] Japan ................................. 4-238811

[51] Int. Cl.⁶ ........................................ B29D 11/00
[52] U.S. Cl. ........................ 264/1.29; 264/1.1; 385/124
[58] Field of Search ................ 264/1.24, 1.29, 264/1.1, 1.7; 385/124, 143

[56] References Cited

U.S. PATENT DOCUMENTS

| | | |
|---|---|---|
| 3,718,383 | 2/1973 | Moore . |
| 3,819,782 | 6/1974 | Irie ............................... 264/1.24 |
| 3,955,015 | 5/1976 | Ohtsuka et al. ................... 264/1.24 |
| 3,999,834 | 12/1976 | Ohtomo et al. . |
| 5,111,526 | 5/1992 | Yamamoto et al. ................ 264/1.29 |
| 5,235,660 | 8/1993 | Perry et al. ..................... 264/1.29 |

FOREIGN PATENT DOCUMENTS

| | | |
|---|---|---|
| 130838 | 1/1985 | European Pat. Off. . |
| 2682969 | 4/1993 | European Pat. Off. . |
| 1-265208 | 10/1989 | Japan ................ 264/1.24 |
| 3-65904 | 3/1991 | Japan . |
| 3-64704 | 3/1991 | Japan . |
| 87/01071 | 2/1987 | WIPO . |

*Primary Examiner*—Mathieu D. Vargot
*Attorney, Agent, or Firm*—Staas & Halsey

[57] ABSTRACT

A polymer is placed and heated within a cylinder 1. Then the polymer is subjected to a pressure and extruded in the form of fibers from a nozzle 3. When a diffusible material is injected from a nozzle 5 through a capillary cylinder 4 into the central portion of the polymer melt, the diffusible material gradually diffuses from the central portion toward the peripheral portion while flowing toward the injection port of the nozzle 3. The material extruded from the nozzle 3 is cooled by air and wound on a drum 7 through a roller 6. Fiber-like molded product has a distribution of refractive index which continuously varies from the central portion toward the periphery portion to result in a light-converging or light-diverging plastic optical transmission medium. Reversely, even though the polymer melt is extruded from the nozzle 5, there can be obtained an optical transmission medium also having a region where the refractive index continuously varies. A variety of selections are possible for the number of cylinders and the material to be supplied into the cylinder.

20 Claims, 5 Drawing Sheets

Rp: RADIUS OF OPTICAL TRANSMISSION BODY
n0: CORE CENTER REFRACTIVE INDEX

Rp: RADIUS OF OPTICAL TRANSMISSION BODY
n0: CORE CENTER REFRACTIVE INDEX

METHOD OF MANUFACTURING PLASTIC OPTICAL TRANSMISSION MEDIUM

TECHNICAL FIELD

The present invention relates to a method of manufacturing various-plastic optical transmission bodies including distributed-refractive-index polymer optical fiber, distributed-refractive-index optical waveguide, distributed-refractive-index rod lens, single-mode polymer optical fiber, and polymer optical fiber having an optical functionality.

BACKGROUND ART

A glass optical transmission medium having a region in which refractive index varies from the center of linear body or bar-like body toward the outer periphery has been already proposed and put into practical use. In particular, the glass optical transmission medium is used as an optical transmission medium having a refractive index distribution capable of providing the bandwidth characteristics required for the application to the optical communication.

However, the glass optical transmission medium involved a problem in its mechanical properties such as poor flexibility and poor shock resistance. It also has some other drawbacks such as low productivity and high production costs.

In contrast with the distributed-refractive-index type glass optical transmission medium, methods of manufacturing distributed-refractive-index optical transmission medium have been proposed in Japanese Patent Laid-open Publication Nos. 3-42603, 3-64704, 3-65904, 3-81701, 3-91703, 3-81704 and 3-81706.

These manufacturing methods, however, had various drawbacks. For example, in the manufacturing method of the optical transmission medium using the difference between the reaction ratios of monomers constituting a polymer, it was impossible to manufacture the optical transmission medium having an elongated transmission distance because the manufacturing method is comprised of a batch process.

On the other hand, the method of manufacturing the optical transmission medium using a melt spinning method exhibited an inconvenience that the control of the distribution of refractive indices is difficult to perform since the materials conferring a transparency are not to be selected due to its copolymer method using two or more types of monomers having reactivity.

Furthermore, in Japanese Patent Application No. 3-27345, the present inventor proposed a manufacturing method capable of providing an excellent transparency even to distributed index optical transmission medium. Unlike the case of the conventional manufacturing method by polymerizing the monomers, in this method, non-polymerizing materials are used in order to suppress the optical scattering due to the phase separation caused by the difference in the polymerizing speeds, thereby reducing the optical guiding loss.

However, this method also has disadvantages such as low productivity and lack of ability to uniformly manufacture elongated optical transmission bodies due to its being dependent on the batch process.

DISCLOSURE OF THE INVENTION

The present invention intends to provide a method of manufacturing a plastic optical transmission medium capable of solving the problems involved in the prior art described above, continuously manufacturing at a higher production efficiency, controlling the distribution of refractive indices with ease, and capable of providing a high transparency through the selection of materials to be used.

The present invention provides a method of continuously manufacturing a plastic optical transmission medium wherein a transparent polymer melt and a transparent diffusible material having a refractive index different from that of the transparent polymer or a material containing the transparent diffusible polymer and a transparent polymer in such a manner that one flows while surrounding the other, diffusing the transparent diffusible material toward the peripheral portion or the central portion to thereby obtain a continuous refractive index distribution, injecting the one material is injected into the central portion or the interior extrusion melt, which is allowed to take place while allowing the diffusion of the diffusible material having a refractive index different from that of the transparent polymer toward the peripheral portion or the central portion or after the completion of the diffusion.

The present invention further provides a method of manufacturing a plastic optical transmission medium comprising the steps of concentrically multi-arranging two or three extrusion nozzle whose injection ports are sequentially located from the upstream side to the downstream side, supplying into the nozzles a transparent polymer melt or a transparent diffusible material having a refractive index different from that of the transparent polymer or a material containing the transparent diffusible material and a transparent polymer, and by the time these materials injected from these extrusion nozzles reach the injection port of the downmost extrusion nozzle, performing extrusion melt molding while simultaneously diffusing the transparent diffusible material toward the peripheral portion or the central portion or after the completion of diffusion.

By selecting the types and compositions of polymers to be used and transparent diffusible materials and by changing the conditions to perform the diffusion, a plastic optical transmission medium whose distribution of refractive indices is appropriately controlled can be continuously manufactured by an extrusion melt molding.

Also, by merely selecting a non-polymerizing material as a transparent diffusible material, there can be obtained a plastic optical transmission medium particularly superior in transparency.

More specifically, the transparent polymer can be polymethyl methacrylate, polyethyl methacrylate, poly-4-methylcyclohexyl methacrylate, polyperfluoro methacrylate, polycyclohexyl methacrylate, poly-2,2,2-tryfluoroethyl methacrylate, polyfurfuryl methacrylate, poly-1-phenylethyl methacrylate, poly-1-phenylcyclohexyl methacrylate, polybenzyl methacrylate, polyphenyl methacrylate, polystyrene, ethylene/vinyl acetate copolymer, polyvinylidene chloride, polyvinylidene fluoride, polytetrafluoroethylene, polyacetals, polycarbonate, polyvinyl acetate, and copolymer containing the above compounds as main constituents and other components copolymerizable therewith.

Particularly preferable are polymethyl methacrylate, polyethyl methacrylate, polycyclohexyl methacrylate, polystyrene series, and copolymer containing the above compounds as main constituents and other components copolymerizable therewith. Table 1 shows the refractive indices of these typical polymers.

TABLE 1

TYPICAL AVAILABLE POLYMER

| POLYMER | REFRACTIVE INDEX |
| --- | --- |
| poly-2,2,2-tryfluoroethyl methacrylate | 1.420 |
| polymethyl methacrylate | 1.492 |
| poly-4-methylcyclohexyl methacrylate | 1.4975 |
| polycyclohexyl methacrylate | 1.5066 |
| polyfurfuryl methacrylate | 1.5381 |
| poly-1-phenylethyl methacrylate | 1.5487 |
| poly-1-phenylcyclohexyl methacrylate | 1.5645 |
| polybenzyl methacrylate | 1.5680 |
| polyphenyl methacrylate | 1.5706 |

It is most important for the transparent and diffusible materials must have an ability to diffuse in the transparent molten polymer simultaneously used therewith and any one can be used as long as its boiling point is higher than the temperature, at which the melt molding is executed, and its refractive index is different from the polymers.

In view of providing a higher transparency, typically used are non-polymerizing compounds, for example, phthalic acid series ester compounds benzoic acid series ester compounds and naphthalene series compounds. Such compounds may be used either singly or in the form of mixture, but it is desirable to consider so that they does not influence the transparency will not affected in utilizing the advantages of the non-polymerizing materials.

The use of mixture would allow a more strict control of the distribution of refractive indices. Table 2 shows the refractive indices of the typical compounds available for the transparent and diffusible materials.

The available transparent and diffusible materials are not limited to the compounds listed in table 2.

By way of example, as the non-polymerizing molecular compounds having high refractive index and low molecular weight, there can be used benzoic anhydride (BA, molecular weight: 226, boiling point: 360° C.), diphenyl phthalate (DPP, molecular weight: 318), (BP, molecular weight: 198, boiling point: 298° C.) phenyl benzoate. Although as an example of the transparent and diffusible material which is not non-polymerizing there is listed benzyl methacrylate, such material is not limited to the listed one.

TABLE 2

TYPICAL DIFFUSIBLE MATERIALS AVAILABLE FOR THE CASE MAINLY USING MMA POLYMER AS POLYMER

| Name of Substance (Abbreviated Designation) | Molecular Weight | Refractive Index | Boiling Point (°C.) |
| --- | --- | --- | --- |
| (High Refractive Index and Low Molecular Compound) | | | |
| benzyl-n-butyl phthalate (BBP) | 312 | 1.540 | — |
| dibenzyl ether (DBE) | 198 | 1.562 | 298 |
| phenoxy toluene (PT) | 184 | 1.573 | 271 |
| 1,1 bis-(3,4, dimethylphenyl) ethane (BIE) | 226 | 1.564 | 173 (at 5 mmHg) |
| diphenyl ether (DPE) | 170 | 1.579 | 259 |
| biphenyl (DP) | 154 | 1.587 | 255 (at 75° C.) |
| diphenyl sulfide (DPS) | 186 | 1.633 | 296 |
| diphenyl methane (DPM) | 168 | 1.577 | 264 |
| 1-methoxyphenyl-1-phenylethane | — | 1.571 | — |
| benzyl benzoate | — | 1.568 | — |

TABLE 2-continued

TYPICAL DIFFUSIBLE MATERIALS AVAILABLE FOR THE CASE MAINLY USING MMA POLYMER AS POLYMER

| Name of Substance (Abbreviated Designation) | Molecular Weight | Refractive Index | Boiling Point (°C.) |
| --- | --- | --- | --- |
| bromobenzene | — | 1.557 | — |
| o-dichlorobenzene | — | 1.551 | — |
| m-dichlorobenzene | — | 1.543 | — |
| 1,2-dibromoethane | — | 1.538 | — |
| 3-phenyl-1-propanol | — | 1.532 | — |
| benzyl methacrylate (BzMA) | 176 | 1.567 | — |
| (Low Refractive Index and Low Molecular Compound) | | | |
| dioctyl phthalate (DOP) | 390 | 1.486 | 384 |

In general, the material. which is not non-polymerizing as the diffusible material provides lower the transparency than that in the case of using the non-polymerizing materials, but this will not matter in manufacturing non-elongate plastic optical transmission medium such as plastic lens. However, in the case an extremely high transparency is required as in the optical fiber for telecommunication, it is preferable to select a non-polymerizing material.

Preferred method of polymerizing monomers to obtain a polymer can be a thermal polymerization method by use of radical polymerizing catalyst or a photo polymerization method by use of photo polymerizing catalyst. At that time, it is effective to add the polymerization initiator, polymerization accelerator, and photosensitozer which are conventionally known. It is also preferable to control the molecular weight by use of conventionally known chain transfer agent in order to prevent the change in viscosity at the time of molding, and thermal polymerization.

In executing the present invention, in order to confer light converging property to the optical transmission medium, the refractive index in the central portion of the optical transmission medium is to be higher than that in the peripheral portion, whereas in order to provide a light diverging property thereto, the refractive index at the central portion is to be lower than that of the peripheral portion. Accordingly, if a diffusible material whose refractive index is higher than that of the polymer is selected, and it is injected into the center of the polymer melt for the diffusion for a predetermined period of time, there will be obtained a light converging optical transmission medium. On the contrary, if selecting the diffusible material whose refractive index is lower than that of the polymer is selected and it is injected into the center of the polymer melt for the diffusion for a predetermined period of time, there will be obtained a light diverging optical transmission medium.

The above relationship will be reversed when the polymer melt is injected into the central portion of a diffusible material or the material containing a diffusible material and material and a transparent polymer melt.

The conditions for diffusion, in particular, diffusion time, temperature and the like may be adjusted to change the range of the region in which the refractive indices continuously vary. In general, the region in which the refractive indices continuously vary will be reduced accordingly as the diffusion time is shortened, thereby rendering the refractive index gradient relatively steep, whereas that region will be enlarged accordingly as the diffusion time is elongated, thereby rendering the refractive index gradient relatively gentle.

Furthermore, the diffusion speed varies depending on the temperature, so that the diffusion for the same time may result in a different refractive index distribution. The application of the present invention to the plastic optical transmission medium having a steeply changing refractive index region such as SI type optical fiber would allow a steep but smooth variation in the refractive index since such variation is caused by the diffusion. This is very beneficial in view of reducing the light scattering loss due to the discontinuous change of the refractive index.

Two or three extrusion nozzle are concentrically multi-arranged so that their respective injection ports are sequentially positioned from the upstream side to the downstream side, thereby selectively supplying into respective nozzles transparent polymer melt having a predetermined refractive index or a transparent diffusible material or the material containing the transparent diffusible material and a transparent polymer melt with refractive index differing from that of the diffusible material. Thus, by the time these materials to be supplied are injected and reach the downmost injection port, extrusion melt molding is accomplished while simultaneously diffusing the transparent diffusible material toward the central portion or the peripheral portion or alternatively after the completion of diffusion, thereby providing a continuous variation in the refractive index to the plastic optical transmission medium.

For example, in the order beginning from the inside, let $n0$, $n1$ and $n2$ be refractive indices of the materials to be supplied into three extrusion nozzles, respectively. Then, if extrusion melt molding is effected with the diffusion taking place for a predetermined period of time by selecting the materials so as to be $n0>n1>n2$, there will be realized in the plastic optical transmission medium a GI-shaped structure in which the refractive index is continuously reduced from the central portion toward the peripheral portion.

On the contrary, with $n0<n1<n2$, there will be obtained a GI-shaped structure in which the refractive index is continuously increased from the central portion toward the peripheral portion.

By way of another example, if the refractive indices of the materials to be supplied into the nozzles are selected so as to be $n0>n2>n1$ in the order beginning from inside and a melt molding of optical transmission medium is performed with the diffusion taking place for a relatively short period of time, the plastic optical transmission medium can present a so-called W-shaped structure or a structure resembling thereto in which an intermediate region having a lower refractive index exists between the core and the clad. In such structured optical transmission medium, there can be improved bandwidth characteristics by virtue of the offset function between the material dispersion and the waveguide dispersion (For more detail, refer to "Basis of Optical Fiber" written and edited by Takanori Ohkoshi, first edition, first print, pp. 150 to 154, paragraph 7.2). In this case, also, the variation in the refractive indices is steep but smooth, and hence the optical scattering loss in the interference region can be largely reduced.

Thus, even in the case of using three nozzles, there can be obtained a plastic optical transmission medium superior in characteristics and having a variety of distributions of refractive indices, by selectively controlling the type or concentrations of the materials to be supplied into the nozzles to thereby control the value of $n0$, $n1$ and $n2$ and by selectively controlling the conditions of diffusion.

FIG. 1 illustrates an example of the apparatus for use in the manufacturing method of the present invention. Description will now be given of a case where into the central portion of a transparent polymer melt there is injected a transparent and diffusible material whose refractive index is different from that of the transparent polymer.

First, a monomer is solely polymerized. Then, thus obtained polymer A is introduced into a cylinder 1 and heated by a heating means such as a heater not shown. The polymer A is subjected to a pressure by a material and pressure supply source 2 (nitrogen gas pressure source, or means of press-forwarding the material by the pump, piston or the like) so as to be extruded from a nozzle 3 in the shape of fibers. On the other hand, a transparent diffusible material B is injected into the central portion of melt of the polymer A from a nozzle 5 via a capillary cylinder 4 at a pressure not less than the pressure from the material and pressure supply source 2, whereby the diffusible material B starts to gradually diffuse from the central portion toward the peripheral portion while flowing toward the injection port of the nozzle 3. The material extruded from the injection port of the nozzle 3 is cooled by air and wound up by a winder 7 via a nip roller 6.

Thus obtained fiber-like product possesses a distribution of concentrations of diffused material which continuously lowers from the central axis and its vicinity toward the peripheral portion, correspondingly to which there is formed a plastic optical transmission medium having light converging properties (where the refractive index nB of the material B>the refractive index nA of the polymer A) or light diverging properties (where nA>nB).

By appropriately selecting and varying the extruding pressures from the nozzles and distances between the nozzle injection ports, the optical transmission medium is melt molded while simultaneously performing the diffusion to thereby narrow the diffusion region or the region where the refractive indices continuously vary, or alternately its cooling is done after the full diffusion to thereby continuously vary the refractive indices over the wider range.

A material and pressure supply source for the nozzle 5 (cylinder 4) can be a nitrogen gas pressure source, pump, piston or any arbitrary means like that for the nozzle 3 (cylinder 1).

The material to be injected from the nozzle 5 may be a mixture of several types of diffusible compounds, a sol of monomer constituting the peripheral portion, and molten polymer, without being limited to a single type of substance.

As opposed to the above example, the nozzle 5 (cylinder 4) may be replaced in role by the nozzle 3 (cylinder 1) so that from the latter there can be extruded a transparent and diffusible material or a polymer melt B containing the material, into the central portion of which there can be injected a polymer melt A from the former. In this case, the diffusion of the diffusible substance occurs from the peripheral portion toward the central portion. In the same manner as the above case, the distribution of refractive indices having a reversed gradient is obtained correspondingly to the relationship in magnitude between refractive indices of the two materials, and the extension of the region where the refractive indices continuously vary can be controlled by the extrusion pressures, the distances d, etc.

Although doubled nozzles are employed in the apparatus shown in FIG. 1, there may be provided three nozzles 5, 3, 8 as shown in FIG. 5, which are supplied with any one of a transparent polymer melt having a predetermined refractive index, a transparent diffusible material, or a transparent polymer melt containing the material and having a different refractive index from that of the material. By the time these materials to be supplied are injected and reach the injection port of the lowermost nozzle 8, the diffusible material is diffused toward the central portion or the peripheral portion to perform an extrusion melt molding in the same manner as FIG. 1, thereby conferring various continuous changes in refractive index onto the plastic optical transmission medium.

For example, let n5, n3, and n8 be refractive indices of the materials to be supplied into the three extrusion nozzles 5, 3, and 8, respectively, in the order viewed from the inside (from the central portion toward the peripheral portion). Then, if selecting the materials so as to be n5>n3>n8 for diffusion for a predetermined period of time to extrusion melt mold an optical transmission medium, there is obtained a GI-shaped structure in which the refractive index is gradually reduced from the central portion toward the peripheral portion. Reversely, if the same diffusion and extrusion melt molding are applied where n5<n3 <n8, there is obtained an element of GI-shaped structure in which the refractive index is gradually increased from the central portion toward the peripheral portion.

Furthermore, if materials to be supplied into the three extrusion nozzles 5, 3, and 8 are selected so that refractive indices n5, n3, and n8 of the materials in the order beginning from the inside are n5>n8>n3, and if the distances d' or d" is shortened or alternatively the flow rates of the materials are increased, and extrusion melt molding is executed for obtaining the optical transmission medium while allowing the diffusion, there can be realized a plastic optical transmission medium having a so-called W-shaped structure including an intermediate region of lower refractive index between the core and clad and presenting improved bandwidth characteristics.

In order to actually establish the above relationship n5>n8>n3, the three nozzles are to be fed with, in the order beginning from the inside, for example, a polymer obtained by polymerizing methyl methacrylate, a compound obtained by adding to the polymer a relatively large amount of (for example, part of 60 wt %) dioctyl phthalate, and a compound obtained by adding to the polymer a relatively small amount of (for example, part of 30 wt %) dioctyl phthalate.

In the same way, there can be easily formed optical elements such as plastic fiber or plastic lens having a variety of refractive index distributions (profile).

Irrespective of the number of nozzles, the refractive indices of the materials can be set to predetermined values by selectively controlling the type or compositions (for example, concentration of the diffusible substance with respect to the polymer melt) of the polymers or diffusible materials to be supplied into the nozzles.

Through the change of conditions to perform the diffusion, there can be formed a plastic optical transmission medium whose refractive index is controlled to be a desired one.

BEST MODE FOR CARRYING OUT THE INVENTION

Preparation of Sample to be Evaluated and Method of Evaluation

In order to obtain a sample for evaluation of imaging characteristics, both end surfaces of distributed index optical element prepared in embodiments were ground by a grinder into parallel planes perpendicular to the longitudinal axis so that the element has a length of about a fourth the period (L) of a light beam which is judged from the swell of an He-Ne laser beam transmitting therethrough. This sample was used to form a lattice image to observe the distortion of the image.

The distribution of refractive index was measured by use of INTERFACO interference microscope supplied from CARL ZEISS company, and the measurement of the optical transmission loss by cutback method as well as the measurement of the bandwidth by pulse method were appropriately effected.

Embodiment 1

Methyl methacrylate (hereinafter referred to as MMA) used as a monomer was polymerized at 75° C. for 24 hours with the addition of benzoyl peroxide (hereinafter referred to as BPO) of 0.5 wt % acting as a polymerization initiator and normal butyl mercaptan (hereinafter referred to as nBM) of 0.2 wt % acting as a chain transfer agent. The refractive index (n) of obtained polymer was 1.492.

Figure 1:
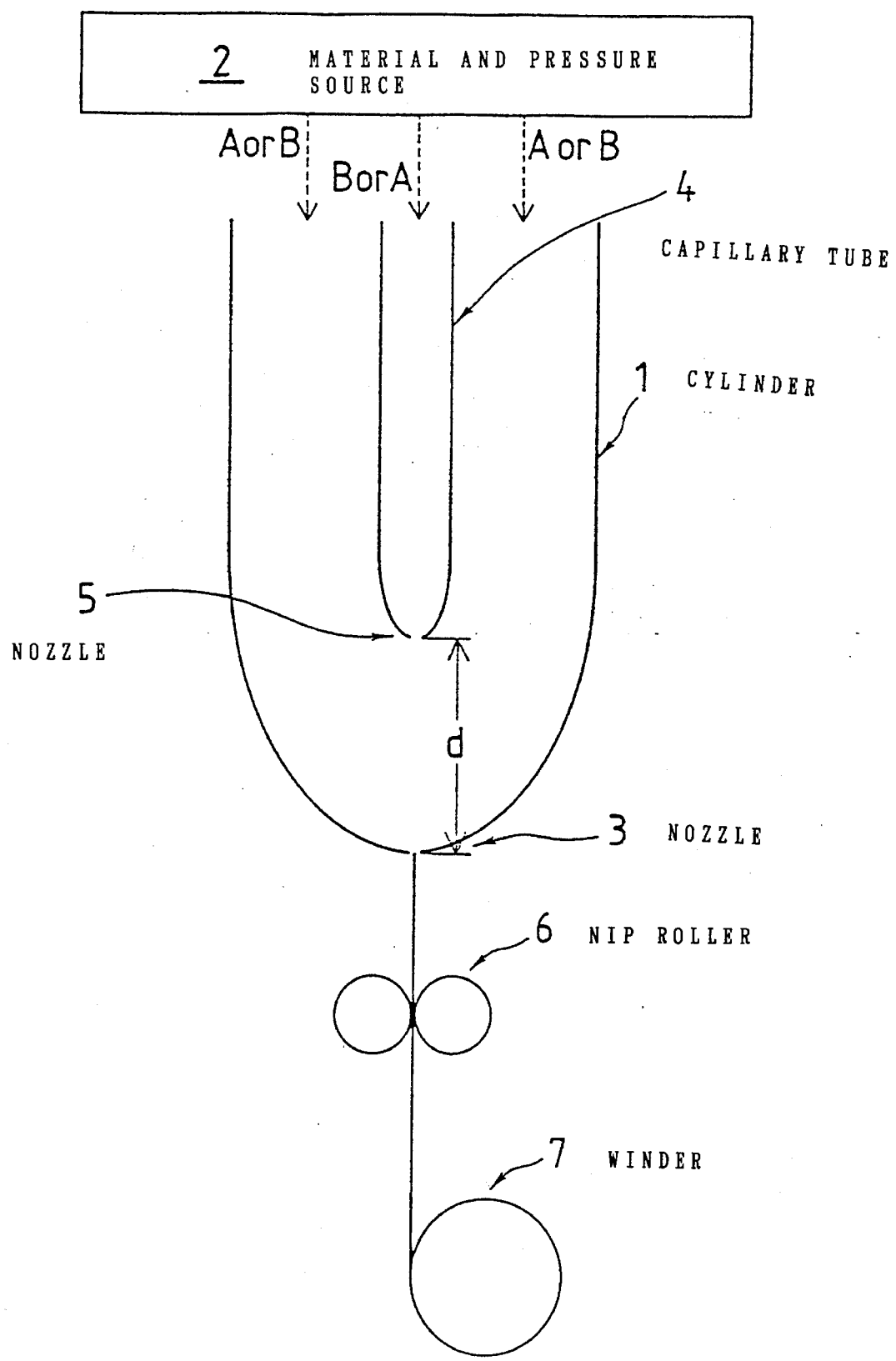
FIG. 1 is a schematic view showing an example of an apparatus for executing the manufacture of a polymer optical transmission medium in accordance with the present invention.

This was placed within a cylinder 1 (10 mm in inner diameter, 30 mm in outer diameter) of optical waveguide spinning machine as shown in FIG. 1. Under this state, through a nozzle 5 of a capillary cylinder 4 there was applied a pressure of 5.05 Kg/cm$^2$ by use of a nitrogen gas pressure source so as to extrude phthalate ester having a refractive index of 1.540 composed of benzyl-n-butyl phthalate.

Figure 2:
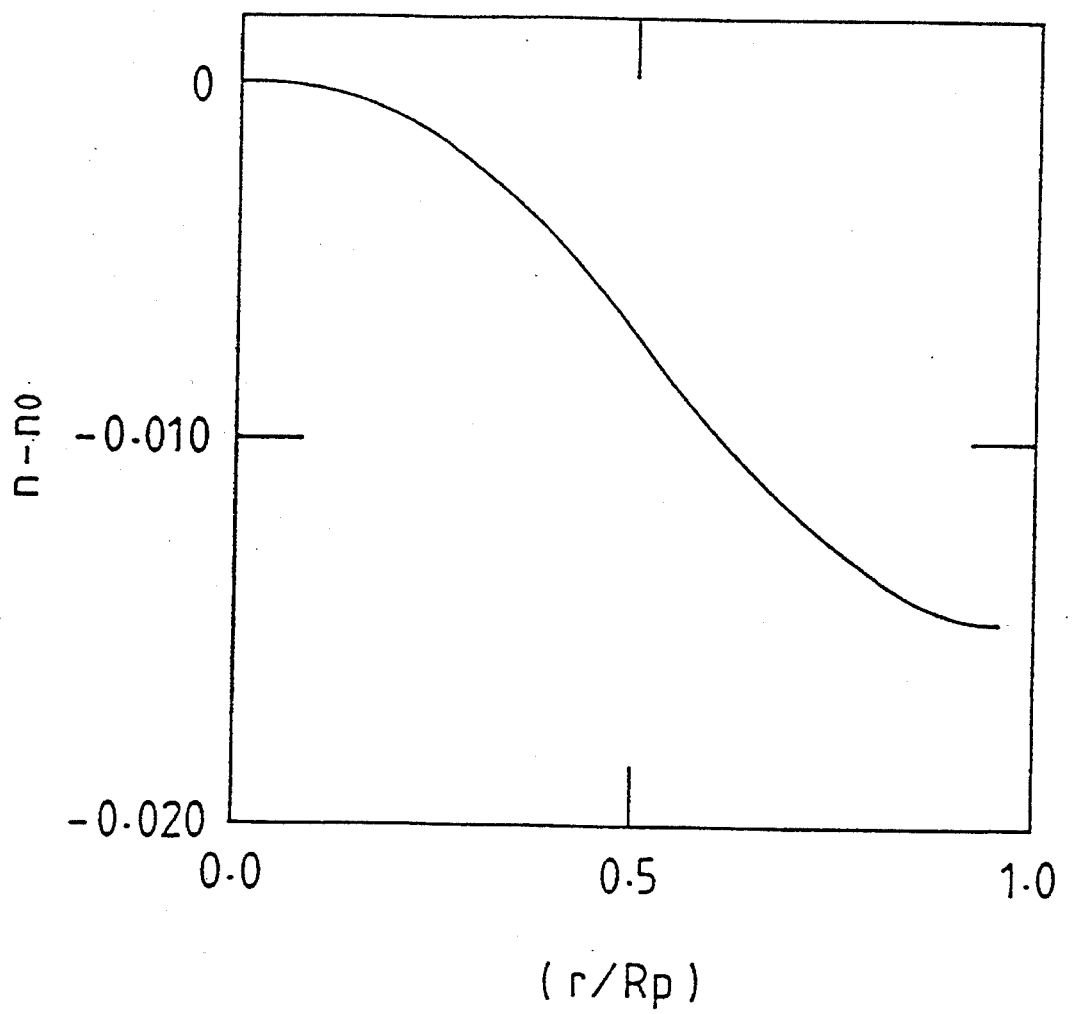
FIG. 2 is a diagram representing a distribution of refractive indices presented by an optical transmission medium 1 mm in diameter manufactured by injecting a diffusible material (benzyl-n-butyl phthalate) into the central portion of an MMA polymer melt.

At that time, the distance from the outlet (nozzle 5) of the cylinder 4 to the nozzle 3 was 30 mm. The temperature within the cylinder was 185° C. The optical transmission medium melt spun from the nozzle 3 having a diameter of 1 mm was rendered to have a distribution of refractive indices which are continuously lowered from the region of the central axis to its periphery as shown in FIG. 2. The difference in refractive index between the central portion and the peripheral portion, which was measured by use of the INTERFACO interference microscope, was 0.015.

This optical transmission medium was cut at an interval of 5.6 mm (at ¼ pitch of meander period L of light beam), and the ends were ground to observe images projected onto the end surfaces. As a result, inverted real images having less turbulence were observed.

Figure 3:
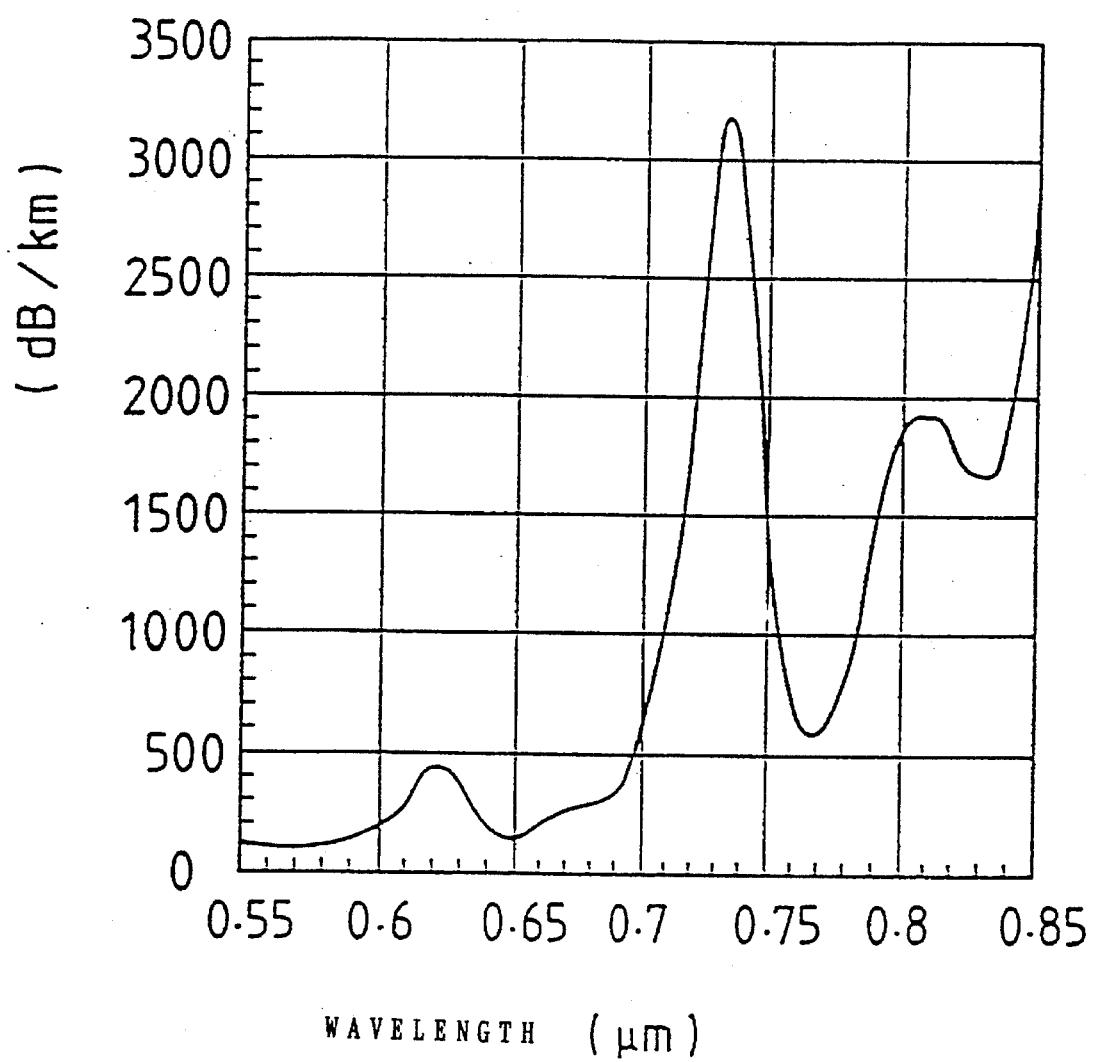
FIG. 3 is a graph describing a transmission loss of the optical transmission medium shown in FIG. 2 in the form of a function of wavelengths.

It was also found from the measurement of the transmission loss of this optical transmission medium by cutback method that there appears the minimum of about 90 dB/km at wavelength of 570 nm as shown in FIG. 3.

Embodiment 2

Similarly to the embodiment 1, MMA used as a monomer was polymerized at 75° C. for 24 hours after adding BPO of 0.50 wt % serving as polymerization initiator and nBg of 0.2 wt % serving as chain transfer agent to obtain a polymer having a refractive index of 1.492.

This was placed within a cylinder 1 of an optical waveguide spinning machine shown in FIG. 1. Under this state, the optical transmission medium was melt spun from a nozzle 3 with just the same materials and the same conditions as in the embodiment 1 except that the nitrogen gas pressure source is substituted by a piston. Thus obtained optical transmission medium presented characteristic evaluation results substantially the same as the case of the embodiment 1.

Embodiment 3

In the same manner as the embodiment 1, MMA used as a monomer was polymerized at 75° C. for 24 hours after adding BPO of 0.50 wt % serving as polymerization initiator and nBM of 0.2 wt % serving as chain transfer agent to obtain a polymer having a refractive index of 1.492.

This was placed within a cylinder 1 of an optical waveguide spinning machine shown in FIG. 1. Under this state, benzyl-n-butyl phthalate solution containing 60 wt % of polymerized MMA was introduced into a cylinder 4 for the extrusion from a nozzle 5. At that time, the distance d' between the nozzle 5 and the nozzle 3 was 30 mm, and the temperature within the cylinder 1 was 220° C. to 240° C.

As a result of this, the distribution of refractive indices of thus obtained optical transmission medium took the shape similar to FIG. 2 which are from the central portion to the peripheral portion gradually lowered in proportion to the square of the distance from the center.

The measurement of the transmission zone confirmed that there exists an extremely wide transmission zone of about 300 MHz.km or more. This corresponds to about 60 times the optical fiber of step index (step refractive type) available on the market.

Embodiment 4

Similar to the embodiment 1, MMA used as a monomer was polymerized at 75° C. for 24 hours after adding BPO of 0.50 wt % serving as polymerization initiator and nBM of 0.2 wt % serving as chain transfer agent to obtain a polymer having a refractive index of 1.492.

This was placed within a cylinder 1 having inner diameter of 10 mm and outer diameter of 20 mm shown in FIG. 1. Benzyl-n-butyl phthalate solution (1.5315 in refractive index) containing 60 wt % of polymerized MMA was introduced into a capillary tube 4 for the extrusion from a nozzle 5. The temperature within the cylinder 1 was 185° C.

Since the diffusion coefficient of the benzyl-n-butyl phthalate is about $5\times10$ cm$^2$/sec, the time of the order of at least 54 seconds is required to allow the distribution of the refractive index to be formed around the central portion.

In this embodiment, with the attempts to limit the region where the refractive index continuously varies to a small range, the diffusion is permitted only about for 25 seconds to perform a melt spinning to obtain an optical transmission medium with the shortened distance d=5 mm between the nozzles.

Figure 4:
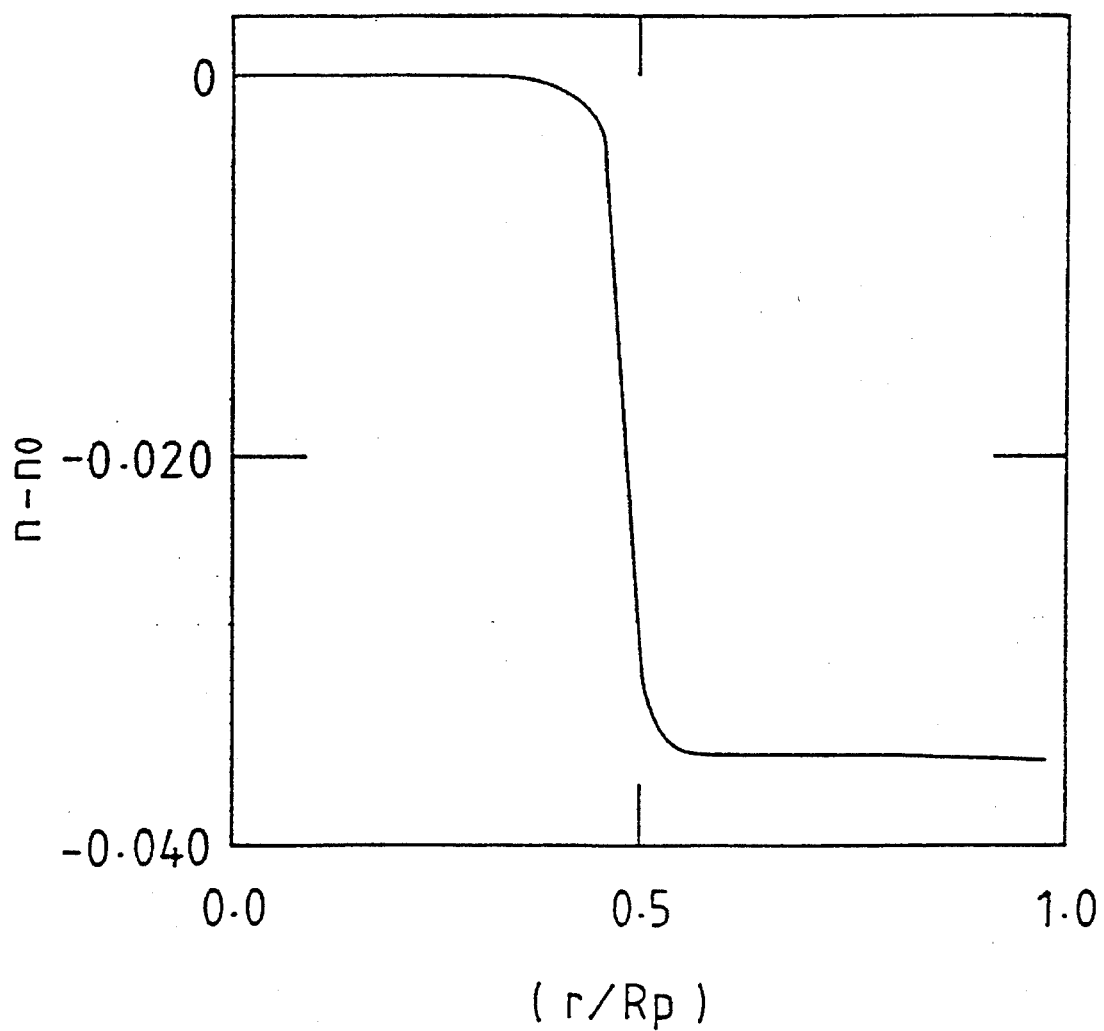
FIG. 4 is a diagram representing a distribution of refractive indices presented by an optical transmission medium 1 mm in diameter manufactured by diffusing a diffusible material (benzyl-n-butyl phthalate) for a short period of time.

The distribution of refractive indices of this optical transmission medium resembles the step index type in which the interfacial area between the core area and the clad area is in the form of a region where the refractive indices sharply and continuously change as shown in FIG. 4.

The diffusion, although for a short period of time, allows the refractive indices in the interfacial area between the core area and the clad area to smoothly vary in sequence though sharply, and prevents it from becoming a pure step index type. As described earlier, this contributes to a significant reduction in the optical scattering loss in the core-clad interfacial are. Actually, the optical transmission loss of the obtained SI-type plastic optical transmission medium measured by use of a spectral analyzer was 110 dB/km at the wavelength of 650 nm, which is fairly low.

Embodiment 5

Similarly to the embodiment 1, MMA used as a monomer was polymerized at 75° C. for 24 hours after adding BPO of 0.50 wt % serving as polymerization initiator and nBM of 0.2 wt % serving as chain transfer agent to obtain a polymer having a refractive index of 1.492.

Figure 5:
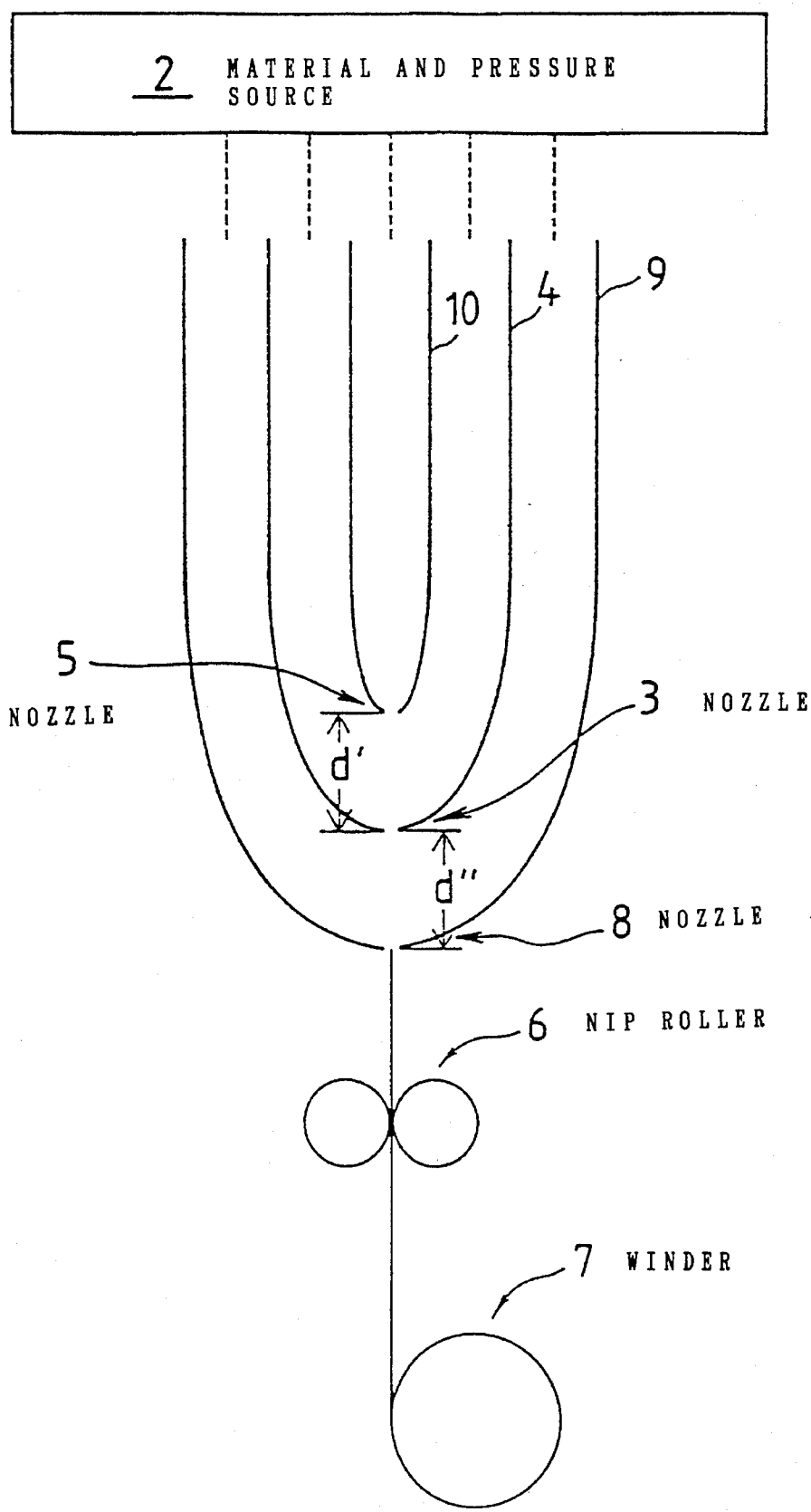
FIG. 5 is a schematic view showing another example of an apparatus for executing the manufacture of a polymer optical transmission medium in accordance with the present invention.

This was fed into a cylinder 9 (10 mm in inner diameter, 20 mm in outer diameter) of an optical waveguide spinning machine as shown in FIG. 5, while benzyl-n-butyl phthalate solution (refractive index of 1.509) containing 70 wt % of polymerized MMA was introduced into a cylinder 4 (5 mm in inner diameter, 10 mm in outer diameter) for extrusion from a nozzle 3.

Simultaneously with this, benzyl-n-butyl phthalate solution (refractive index=1.5315) containing 50 wt % of polymerized MMA was introduced into the innermost cylinder 10 for extrusion from the nozzle 5. At that time, the temperature within the cylinder 9 was 200° C., and the distances between the nozzles were d'=d"=15

Since the diffusion coefficient of the benzyl-n-butyl phthalate is about $5\times10^{-6}$ cm$^2$, the minimum distribution of the refractive indices is supposed to substantially reach the central portion in about 20 seconds, according to the analysis by the Fick's diffusion equation by use of an error function. Thus, in the distribution of refractive indices of the optical transmission medium obtained after the lapse of time of about 3 minutes which is supposed to be an actual diffusion time value required to obtain a satisfactory distribution of refractive indices by the time melt spinning is performed with the outer diameter of 1 mm from the nozzle 8, the refractive indices were gradually lowered from the central portion toward the peripheral portion. The difference in refractive index between the central portion and the peripheral portion was of the order of 0.018.

The measurement of the transmission zone resulted in about 100 MHz.km which is about 20 times the value of the optical fiber of the step index type (step refractive type) available on the market.

Embodiment 6

A mixture solution of MMA of 80 wt % and diphenyl sulfide (hereinafter, referred to as DPS) of 20 wt % was polymerized at 75° C. for 24 hours after adding BPO of 0.50 wt % serving as polymerization initiator and nBM of 0.2 wt % serving as chain transfer agent. This was heated at 100° C. for 24 hours to obtain a material C for supply.

Similarly, a mixture solution of MMA of 80 wt % and dimethyl phthalate (DMP) of 20 wt % was polymerized and heated in the same manner as the case of the material C for supply, to thereby obtaining a material D for supply.

Moreover, the mixture of MMA of 80 wt % and diphenyl ether (DPE) of 20 wt % was used as a monomer which was then subjected to a polymerization and heat treatment, thus obtaining a material E for supply.

The material E for supply is fed into the outermost cylinder 9 (10 mm in inner diameter, 20 mm in outer diameter) in the arrangement shown in FIG. 5, the material D for supply is fed into the intermediate cylinder 4 (5 mm in inner diameter, 10 mm in outer diameter), and the material C for supply is fed into the innermost capillary cylinder 10, thereby extruding the materials through the corresponding nozzles 5, 3 and 8, respectively.

The temperature within the cylinder 9 was 200° C., and the distances between the nozzles in the axial direction were $d'=d''=15$ mm.

The diffusion was effected for about 3 minutes by the time melt spinning was performed with the outer diameter of 1 mm from the nozzle 8 lying at the distal end. Then, DPS contained the material C for supply supplied fed from the innermost capillary cylinder 10 is diffused outwardly, DMP contained in the material D for supply fed from the cylinder 4 arranged at the intermediate position is diffused outwardly and inwardly, and DPE contained in the material E for supply supplied fed from the outermost cylinder 9 is diffused inwardly, thus producing an optical transmission medium having a W-shaped structure.

It was thus confirmed that correspondingly with DPS contained in the material C to be supplied, DPM contained in the material D for supply, and DPE contained in the material E for supply, respectively, having refractive indices 1.633, 1.502 and 1.579, the refractive indices are highest at the central portion, and once radially outwardly are smoothly lowered once outwardly in radial direction, and then smoothly raised toward the peripheral portion, thereby producing a W-shaped profile of the refractive indices. Besides, the difference between the maximum and minimum of the refractive index was about 0.02.

Although this embodiment employs three-cylinder-multi-arrangement to supply different materials containing diffusible materials to the nozzles, it is also conceivable to employ a couple of cylinders into nozzles of which materials containing diffusible materials having different refractive indices are supplied for extrusion in the same manner as this embodiment.

For example, the way of feeding the equivalent of the material C for supply into the inner (or outer) cylinder and supplying the equivalent of the material D for supply into the outer (or inner) cylinder corresponds to the case where the outermost cylinder 9 and the supply of the material E for supply into the cylinder 9 are omitted. Therefore, in view of the function of forming the distribution of refractive indices due to the mutual diffusion of the confirmed DPS and DMP, it is evident that there can be obtained a refractive index profile in the form of a constantly increasing (or decreasing) function smoothly radially outwardly varying.

Embodiment 7

A mixture solution of gMA of 50 wt % and BzMA 50 wt % was polymerized at 75° C. for 24 hours with the addition of BPO of 0.5 wt % serving as polymerization initiator and nBM of 0.2 wt % serving as chain transfer agent. This was heated at 100° C. for 24 hours to obtain a material F to be supplied.

A transparent mixture containing the material F to be supplied of 70 wt % and dioctyl phthalate (DOP) (refractive index=1.486, boiling point 384° C.) of 30 wt % was fed into the cylinder having an inner diameter of 10 mm and an outer diameter of 30 mm.

On the other hand, the cylinder 4 was fed with the material F which was then extruded from the nozzle 5. At that time, the distance d between both the nozzles was 30 mm, and the temperature within the cylinder 1 was 200° C.

The diffusion for about 10 minutes by the time melt spinning is performed with the outer diameter of I mm from the nozzle 3, the obtained optical transmission medium presenting the same distribution of refractive indices as in FIG. 2.

The difference in refractive index between the central portion and the peripheral portion was about 0.01.

Embodiment 8

The mixture of MMA of 80 wt % and benzyl methacrylate (BzMA) of 20 wt % was used as a monomer, and polymerized for 24 hours at 75° C. with the addition of BPO of 0.50 wt % acting as a polymerization initiator and nBM of 0.2 wt % acting as a chain transfer agent. Thus obtained copolymer presented a refractive index of 1.508.

This was fed into the cylinder 1 (inner diameter=10 mm, outer diameter=30 mm) shown in FIG. 1, while diphenyl ether solution (refractive index=1.537) containing 60 wt % of polymerized copolymer was fed into the capillary tube 4 and then extruded by use of a piston. The distance between the nozzle S and the nozzle 5 was 30 mm, and the temperature within the cylinder 1 was 185° C.

The optical transmission medium obtained by diffusing for about 10 minutes before melt spinning was effected with the outer diameter of 1 mm from the nozzle 3 presented substantially the same distribution of refractive indices as shown in FIG. 2. The difference in refractive index between the central portion and the peripheral portion was about 0.011.

The measurement of the transmission zone resulted in a large value of about 220 MHz.KM.

Embodiment 9

In the same manner as the embodiment 8, the mixture of MMA of 80 wt % and benzyl methacrylate (BzMA) of 20 wt % was used as a monomer, and polymerized for 24 hours at 75° C. after adding BPO of 0.50 wt % acting as a polymerization initiator and nBM of 0.2 wt % acting as a chain transfer agent, thus obtaining copolymer presenting a refractive index of 1.508.

First, a transparent mixture containing 70 wt % of MMfA polymer and SO wt % of dioctyl phthalate was fed into the cylinder 1 (inner diameter=10 mm, outer diameter=30 mm) shown in FIG. 1, while the copolymer of MMA and BzMA was fed into the cylinder 4 for the extrusion from the nozzle 5. The distance between the nozzle 3 and the nozzle 5 was 30 mm, and the temperature within the cylinder 1 was 200° C. The refractive index distribution of the optical transmission medium obtained by diffusing for about 10 minutes until the time melt spinning was effected with the outer diameter of 1 mm from the nozzle 3 presented a profile having a smoother interfacial surface between the core and the clad than the step type, as shown in FIG. 4. The difference in refractive index between the central portion and the peripheral portion was about 0.016.

Embodiment 10

The copolymer of MMA and BzMA which was the material F to be supplied in the embodiment 7 was introduced into the cylinder 1 shown in FIG. 1, while benzyl methacrylate solution containing the material F to be supplied of 60 wt % was fed into the cylinder 4 for the extrusion from the nozzle 5. The distance between the nozzle 3 and the nozzle 5 was 30 mm, and the temperature within the cylinder 1 was 195° C.

The obtained optical transmission medium presented a profile of refractive index distribution in which the refractive indices were lowered from the central portion toward the peripheral portion in the same manner as shown in FIG. 2.

INDUSTRIAL APPLICABILITY

The manufacturing method of the present invention enabled the refractive index distribution to be controlled at high accuracy which was difficult to accomplish in the conventional distributed index plastic optical transmission medium. It also became possible to obtain a variety of refractive index distributions by merely selecting and controlling the combination of the polymeric material and diffusible material, or the content ratio of both, or the material feeding conditions (pressure, temperature, diffusion time, etc.).

Thus, a variety of plastic optical elements of any light converging or light diverging characteristics can be manufactured with high accuracy.

The method of the present invention basically includes the same manufacturing processes as the spinning method, and enables a continuous manufacturing which is highly advantageous in manufacturing an elongated optical transmission medium efficiently.

Moreover, being constituted basically using a single kind of polymer as the base material a highly transparent optical transmission medium can be obtained. In particular, if non-polymer is selected as a diffusible material, there can be realized a high transparency.

The higher transparency improving effect according to the present invention derives from the refractive index distribution by diffusion. More specifically, the utilization of the phenomenon of the diffusion reduces the local distortion in the refractive index distribution, generally smoothing the profile curve. Furthermore, the profile in the core-clad interfacial area, etc., is also continuous and smooth although sharp, largely suppressing the light scattering loss which may arise from the discontinuous change of refractive index.

Such superior optical characteristics coupled with accurate control of refractive index distribution, have a great significance in manufacturing various plastic optical transmission bodies having wider bandwidth and lower loss characteristics which are important in the field of optical communication.

The present invention is applicable to the manufacture of various plastic optical transmission bodies including distributed index polymer optical fiber, distributed index optical waveguide, distributed index rod lens, single-mode polymer optical fiber, and polymer optical fiber having an optical functionality.

What is claimed is:

1. A method of manufacturing a plastic optical fiber transmission medium, comprising the steps of:

providing a cylinder with a melt transparent first polymer;

injecting into a central portion of said cylinder either a transparent and diffusible non-polymerizing material alone or a mixture of a transparent and diffusible non-polymerizing material and a melt transparent second polymer, said non-polymerizing material having a refractive index different from that of said first polymer;

allowing the non-polymerizing material to diffuse into the first polymer without polymerizing, and toward a peripheral region of the cylinder; and performing an extrusion melt molding from the cylinder, thereby forming a plastic optical fiber transmission medium having a region in which the refractive index continuously varies.

2. A method of manufacturing a plastic optical fiber transmission medium according to claim 1, wherein the first polymer and the second polymer are the same kind of polymer.

3. A method of manufacturing a plastic optical fiber transmission medium according to claim 1, wherein the first polymer and the second polymer are different kinds of polymer.

4. A method of manufacturing a plastic optical fiber transmission medium according to claim 1, wherein the first polymer and the second polymer are different kinds of polymer and a core-clad structure is formed with the region in which the refractive index continuously varies being located at a boundary between the core and the cladding.

5. A method of manufacturing a plastic optical fiber transmission medium using a cylinder with a first extrusion nozzle having an ejection port and a second extrusion nozzle having an ejection port, the second nozzle being coaxial with the first nozzle and inside of the first nozzle such that the ejection port of the second nozzle is before the ejection port of the first nozzle, comprising the steps of:

providing the first nozzle with a melt transparent first polymer;

providing the second nozzle with either a transparent and diffusible non-polymerizing material alone or a transparent and diffusible non-polymerizing material and a melt transparent second polymer, said non-polymerizing material having a refractive index different from that of said first polymer;

allowing the non-polymerizing material, between the ejection ports, to diffuse into the first polymer without polymerizing, and toward a peripheral region of the cylinder; and performing an extrusion melt molding from the ejection port of the first nozzle, thereby forming a plastic optical fiber transmission medium having a region in which the refractive index continuously varies.

6. A method of manufacturing a plastic optical fiber transmission medium according to claim 5, wherein the first polymer and the second polymer are the same kind of polymer.

7. A method of manufacturing a plastic optical fiber transmission medium according to claim 5, wherein the first polymer and the second polymer are different kinds of polymer.

8. A method of manufacturing a plastic optical fiber transmission medium according to claim 5, wherein the first polymer and the second polymer are different kinds of polymer and a core-clad structure is formed with the region in which the refractive index continuously varies being located at a boundary between the core and the cladding.

9. A method of manufacturing a plastic optical fiber transmission medium according to claim 8, wherein an additive is mixed with the first polymer before providing the first nozzle with the first polymer, the additive being a transparent and diffusible non-polymerizing material different than the non-polymerizing material provided to the second nozzle, having refractive index different than the non-polymerizing material provided to the second nozzle.

10. A method of manufacturing a plastic optical fiber transmission medium comprising the steps of:

providing a cylinder with a mixture of a melt transparent first polymer and a transparent and diffusible non-polymerizing material;

injecting into a central portion of said cylinder a melt transparent second polymer, said non-polymerizing material having a refractive index different from that of said second polymer;

allowing the non-polymerizing material to diffuse into the second polymer without polymerizing, and toward the central portion of the cylinder; and performing an extrusion melt molding from the cylinder, thereby forming a plastic optical fiber transmission medium having a region in which the refractive index continuously varies.

11. A method of manufacturing a plastic optical fiber transmission medium according to claim 10, wherein the first polymer and the second polymer are the same kind of polymer.

12. A method of manufacturing a plastic optical fiber transmission medium according to claim 10, wherein the first polymer and the second polymer are different kinds of polymer.

13. A method of manufacturing a plastic optical fiber transmission medium according to claim 10, wherein the first polymer and the second polymer are different kinds of polymer and a core-clad structure is formed with the region in which the refractive index continuously varies being located at a boundary between the core and the cladding.

14. A method of manufacturing a plastic optical fiber transmission medium using a cylinder with a first extrusion nozzle having an ejection port and a second extrusion nozzle having an ejection port, the second nozzle being coaxial with the first nozzle and inside of the first nozzle such that the ejection port of the second nozzle is before the ejection port of the first nozzle, comprising the steps of:

providing the first nozzle with a mixture of a melt transparent first polymer and a transparent and diffusible non-polymerizing material;

providing the second nozzle with a melt transparent second polymer, said non-polymerizing material having a refractive index different from that of said second polymer;

allowing the non-polymerizing material, between the ejection ports, to diffuse into the second polymer without polymerizing, and toward a central portion of the cylinder; and performing an extrusion melt molding from the ejection port of the first nozzle, thereby forming a plastic optical fiber transmission medium having a region in which the refractive index continuously varies.

15. A method of manufacturing a plastic optical fiber transmission medium according to claim 14, wherein the first polymer and the second polymer are the same kind of polymer.

16. A method of manufacturing a plastic optical fiber transmission medium according to claim 14, wherein the first polymer and the second polymer are different kinds of polymer.

17. A method of manufacturing a plastic optical fiber transmission medium according to claim 14, wherein the first polymer and the second polymer are different kinds of polymer and a core-clad structure is formed with the region in which the refractive index continuously varies being located at a boundary between the core and the cladding.

18. A method of manufacturing a plastic optical fiber transmission medium according to claim 17, wherein an additive is mixed with the second polymer before providing the second nozzle with the second polymer, the additive being a transparent and diffusible non-polymerizing material different than the non-polymerizing material provided to the first nozzle, having a refractive index different than the non-polymerizing material provided to the first nozzle.

19. A method of manufacturing a plastic optical fiber transmission medium using a cylinder having external, intermediate and internal coaxial extrusion nozzles respectively having three axially displaced ejection ports with the intermediate nozzle being within the external nozzle and the intermediate nozzle being within the internal and external nozzles, comprising the steps of:

providing the nozzles with either a melt transparent polymer alone or a mixture of a melt transparent polymer and a diffusible non-polymerizing material, with at least one of the nozzles being provided with said mixture, said non-polymerizing material having a refractive index different from that of melt transparent polymer;

allowing the non-polymerizing material in the mixture, between the ejection ports, to diffuse into the melt transparent polymer provided alone, without polymerizing; and performing an extrusion melt molding from the ejection port of the external ejection nozzle, thereby forming a plastic optical fiber transmission medium having a region in which the refractive index continuously varies.

20. A method of manufacturing a plastic optical fiber transmission medium according to claim 19, wherein three different non-polymerizing materials having three different refractive indices are provided respectively to the external, intermediate and internal nozzles, respectively, in mixtures with three different kinds of polymer to form a core-clad structure with regions in which the refractive index continuously varies being located at the boundaries between the layers of the core-clad structure.

* * * * *

UNITED STATES PATENT AND TRADEMARK OFFICE
CERTIFICATE OF CORRECTION

PATENT NO. : 5,593,621
DATED : January 14, 1997
INVENTOR(S) : Yasuhiro KOIKE, et al.

It is certified that error appears in the above-indentified patent and that said Letters Patent is hereby corrected as shown below:

TITLE PAGE [56] FOREIGN PATENT DOCUMENTS

"2682969  4/1993  European Pat. Off." should be --2682969 4/1993  France--.

Column 10
   Line 39, "d'=d"=15" should be --d'=d"=15 mm.--.

Column 12
   Line 14, "I mm" should be --1 mm--;
   Line 35, "nozzle S" should be --nozzle 3--;
   Line 57, "SO" should be --30--.

Signed and Sealed this

Eighth Day of April, 1997

Attest:

BRUCE LEHMAN

*Attesting Officer*   Commissioner of Patents and Trademarks